May 21, 1968  G. C. THOMAS  3,384,285
COORDINATED SYSTEM FOR LAYING PARALLEL PIPES
Filed Nov. 9, 1965
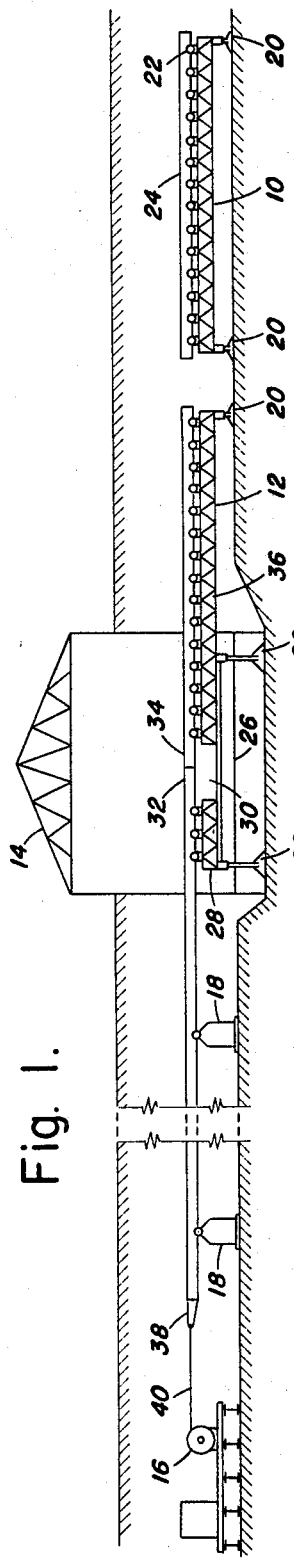
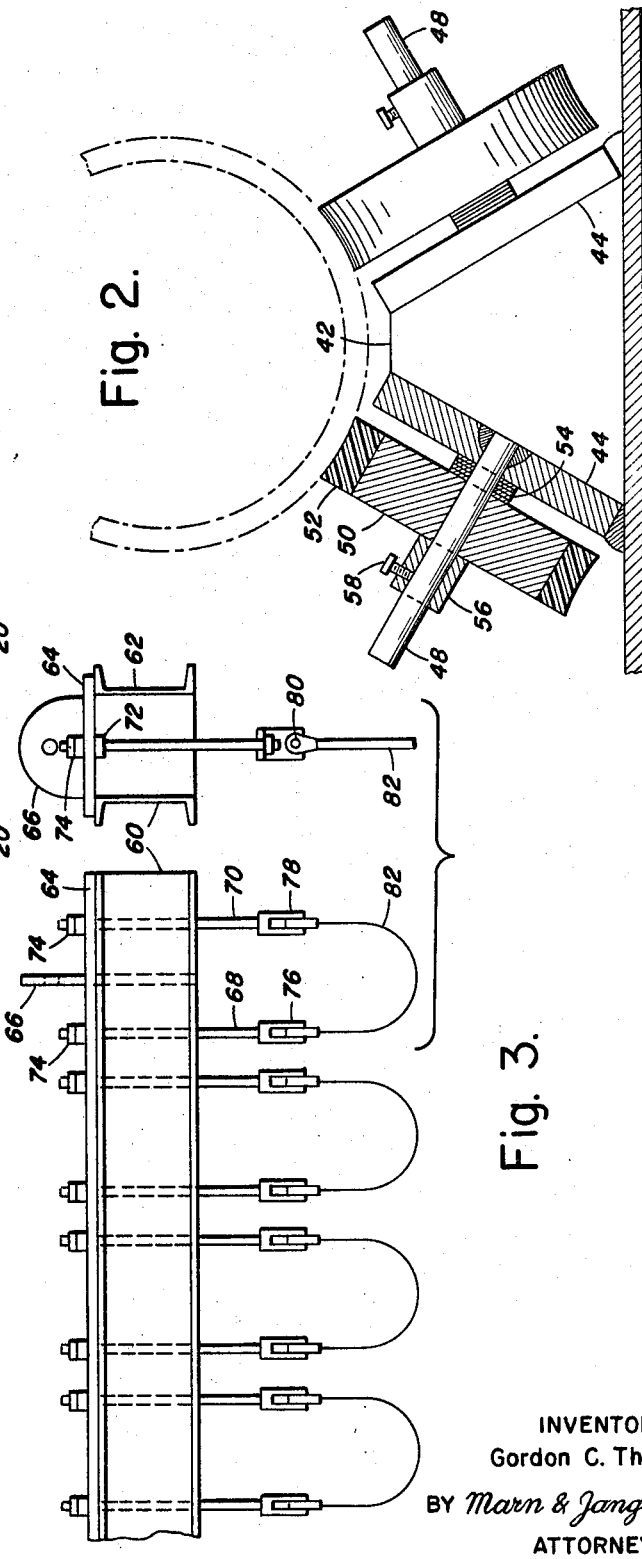
INVENTOR
Gordon C. Thomas
BY *Marn & Jangarathis*
ATTORNEYS

United States Patent Office 3,384,285
Patented May 21, 1968

3,384,285
COORDINATED SYSTEM FOR LAYING
PARALLEL PIPES
Gordon C. Thomas, Westfield, N.J., assignor to The
Lummus Company, New York, N.Y., a corporation
of Delaware
Filed Nov. 9, 1965, Ser. No. 507,006
6 Claims. (Cl. 228—6)

ABSTRACT OF THE DISCLOSURE

A coordinated system for laying parallel pipes, particularly below ground, including a portable pipe preparation rack, welding rack, welding shed, rollers and winch, all located in the trench, if the pipe is to be laid below ground. In employing this system, fifteen hundred feet and more of pipe can be laid with the equipment in one poistion thereby minimizing field welding.

---

This invention relates to a coordinated assembly for laying a plurality of parallel pipes, which may be of varying sizes, below grade level.

In the construction of large fuel, chemical or other liquid storage facilities and distribution systems, as are often associated with petroleum refineries, large airports and the like, the necessary piping associated therewith is preferably laid below grade and, in many instances, it is convenient to lay numbers of pipes in parallel fashion in the same trench. Frequently, these parallel pipes are of different size. While many advances have been made in the coordinated laying of a single pipe in a trench, as employed in long distance pipelines for transportation of natural gas and the like, equipment and procedures for laying parallel pipes in a coordinated manner have been left largely to the ingenuity of the engineer on the site.

On-site or field welding of any type is beset by problems of wind, temperature extremes and access to the structure. This is particularly true with pipe welding in the field, due to the necessity of having perfect, crack-free, fluid tight welds.

In U.S. Patent No. 3,101,530 there is described a method for laying a single pipe which could also be applied to parallel pipes. Forty-foot lengths of pipe are transported by rail to an initial welding station where they are welded into 80 foot lengths, after which the welded lengths are transported by semi-trailer and lowered into the ditch for field welding to previously welded sections. This method reduces field welding only by half and does not really overcome any of the problems associated therewith, such as accurate leveling and aligning of one section with another for a proper welded joint.

It is an object of the present invention to provide an improved assembly for the laying of parallel pipes below grade.

It is another object of the present invention to provide an improved assembly for laying parallel pipes wherein all welding is done under controlled conditions as opposed to field conditions.

Yet another object of the invention is to provide an improved assembly for laying a plurality of pipes below grade, and wherein 1500 feet or more of each pipe can be laid without moving any major pieces of equipment.

Still another object of the present invention is to provide an improved, coordinated pipe laying assembly for laying a plurality of parallel pipes of different sizes.

A still further object of the present invention is to provide a coordinated assembly for laying parallel pipes below grade which is more economic than present pipe laying methods, and in particular which results in more feet of pipe laid per man-hour than present methods.

Various other objects and advantages of the present invention will become clear during the course of the following description of an embodiment thereof, and the novel features will be particularly pointed out in connection with the appended claims.

The present invention is based on the realization that in the laying of a number of parallel pipes, the trench itself is quite wide, sufficiently so to permit carrying out of the necessary assembly operations therein. In essence, the invention comprises the use of seven coordinated pieces of equipment which are described individually below.

A pipe preparation rack is provided in the trench for the purpose of performing the necessary steps preparatory to welding. This rack is long enough to support single lengths of pipe, is wide eonugh to accommodate the number of parallel pipes being laid, and is provided with rollers for guiding the pipe to the next station. The rack is supported on four adjustable legs having sole plates of sufficient size to give the necessary flotation. The rollers themselves are adjustable so as to accommodate pipes of varying sizes.

It should be pointed out that for many large jobs it is economic to fabricate this rack and the other equipment located in the trench for a particular job, so the width of the trench and the number of pipes can be taken into consideration. Those skilled in the art will realize, however, that this equipment can be fabricated initially into appropriate sections, and a suitable number of sections joined together for a given number of parallel pipes to be laid on a job.

The pipe preparation rack is further provided with permanent spirit levels at appropriate locations so that its level can be easily checked, jacks for connecting the leg-adjusting means (electrical or hydraulic), lift rings for transporting the racks, and switches or buttons for controlling the legs, which may be located at a remote console or at each leg.

The next piece of equipment is the welding rack, which is of the same general construction as the preparation rack, but which is somewhat longer, is preferably provided with six adjustable legs, and which has a transve se open section which allows free access around the entire periphery of the pipes for welding. Rolls, jacks and other ancillary equipment are as described above in connection with the preparation rack.

A welding shed is placed around the welding rack in the area around the open section where the actual welding is done. This shed is of light frame construction with transparent or translucent sides and roof and, of course, openings at either end for ingress and egress of the pipes. The shed also has a floor, under the welding rack, on which it rests. The floor may be either a prefabricated section or timbers laid on the graded trench. The shed is equipped with permanent interior lighting and ventilation units and exterior electrical connection jacks. Of course, the shed may be designed to attach directly to the welding rack, which can have its own floor, in which case the shed does not need its own floor. In any event, the object is to protect the welders and the welds from weather, drafts and other problems normally associated with field welding. Sound-powered telephones are provided at each welding station so that welders can communicate with other workers. The shed is also equipped with lift rings for crane handling.

An equipment trailer is provided and is most conveniently located adjacent the welding shed. The trailer, preferably a conventional, enclosed low-boy with dolly, has an appropriate number of welding machines, an air compressor for the internal line-up clamps, an electric generator for powering the jacks on the preparation and welding racks, lights ventilation equipment, cable reels, and a master fuel tank for all fueled units. The trailer also has lockers for maintenance tools, supplies and welding equipment.

A pipe winch unit is located an appropriate distance down the trench from the welding shed, the distance depending on the pulling power of the winches and the length of cable. As noted above, 1500 feet of cable has been employed with success. It is not necessary for there to be as many winches as pipes being laid, since they are not used simultaneously. Four winches on a single base is adequate for most jobs. Power for the winches is provided by a mobile power unit, pneumatic or electric depending on the winch drives. The power unit is conveniently mounted on the same base as the winches to serve as the deadman therefor. A sound-powered telephone is provided for the winch operator, so he can communicate with the welders. Like other equipment, lift rings are provided for crane handling.

A set of pipe support rollers is spaced at intervals in the trench between the welding shed and the winch unit. Each roller unit supports as many pipes as are being laid. Sufficient base plate area must be provided to give necessary flotation and maximum friction with the ground. The rollers themselves should be made of or coated with a resilient material so as not to damage wrappings or the like. The number and spacing of the roller units depends on friction load data, pipe weight and other factors well known to skilled workers.

Lastly, a lifting beam is provided to remove the parallel pipes from the rollers and lower them to grade in the bottom of the trench. The beam is provided with a plurality of straps so that when the lines are lifted, they are supported in their correct positions. The beam and straps are so designed that variations in pipe size and centerline spacing can be taken into account, and the beam is mounted on a suitable carriage so that it can be rolled from one position to the next without disengaging the straps.

Understanding of the invention will be facilitated by referring to the accompanying drawings and the following description thereof. In the drawings:

FIGURE 1 is a side elevation view showing, in simplified form, all equipment located in the trench;

FIGURE 2 is a cross-sectional elevation of one type of roller suitable for use with the invention; and FIGURE 3 shows a partial side elevation and an end elevation of the lifting beam designed for use with the invention.

With reference to FIGURE 1, the main components of the assembly are seen to comprise the pipe preparation rack 10, the welding rack 12, the welding shed 14, the winch unit 16 and roller supports 18. The equipment trailer and lifting beam, both located at grade level, are not shown.

Preparation rack 10 has jacks 20, which may be electric (worm gear) or hydraulic (piston) at each corner so that it may be kept level. Spirit levels (not shown) permanently attached to the rack assist in making fine adjustments. Construction of rack 10 depends on design loads. As shown, light structurals are formed into a truss section for the longitudinal beams, but solid beam may be preferred for heavier loads. Cross-beams (not shown) support the rollers and form a rigid frame. As noted above, the rack may be fabricated for a particular job having as many sets of rollers as there are parallel pipes to be laid, or prefabricated sections with one or two sets of rollers per section may be bolted together until a sufficient number is attained. In the latter instance, sections having jacks attached would be used on the ends and, if necessary, centrally. A single set of rollers 22 is shown in FIGURE 1 supporting a single length of pipe 24.

In operation, pipe is delivered to the site on flat bed trailers or other conveyance and is lifted by a conventional crane (not shown) at grade level onto preparation rack 10, care being taken that pipe of the proper size is placed on the proper set of rollers where several pipe sizes are involved. After the necessary preparation (cleaning, etc.) and, when the corresponding section of welding rack 12 is empty, pipe 24 is pushed onto the welding rack.

As shown in FIGURE 1, it is convenient to dig the trench somewhat deeper near the welding station and, for this reason, welding rack 12 should be provided with three sets of jacks 20. The deeper area of the trench allows a floor 26 to be inserted thereunder as part of welding shed 14. The rack itself has a forward section 28 with sets of parallel rollers, a transverse channel section 30 where the butting pieces of pipe 32, 34 are unsupported and where welding takes place, and a rear section which is, in essence, an extension of pipe preparation rack 10. Construction of welding rack 12 is otherwise generally similar to preparation rack 10.

The open end of the first pipe length nearest the winch is fitted with a suitable bull-nose 38 and, after a weld is completed, winch 16 winds up a length of cable 40 equal to one length of pipe. The pipe passes over rollers 18 as it is pulled. In some instances it may be convenient to have roller 18 nearest welding shed 14 somewhat higher.

Inspection and wrapping functions are carried out while the pipe is on rollers 18. After the necessary number of pipes have all been welded and pulled down to near the winch, the lift beam is employed to lift them all off the rollers simultaneously and lower them to the ground. The lift beam is described hereinbelow in connection with FIGURE 3. Thus, the coordinated assembly of the invention requires only one set of field welds each time the equipment is moved. As noted above, this may be 1500 feet or more, depending on pipe size, winch capacity, etc.

A variety of different rollers may be employed in accordance with the invention, the only requirements being that they be adjustable to varying sizes of pipe and, where necessary, they have a suitable resilient surface so as not to mar or damage the pipe. One such roller is illustrated in FIGURE 2. In FIGURE 2, a pair of end-plates 42 are separated by two face-plates 44 attached at an appropriate angle (60°) and welded to the rack 46 (preparation or welding). A stationary shaft 48 is welded into each face plate normal to the surface thereof, and a roller 50 having a resilient surface 52 of, for example, polyurethane or other resilient material, is mounted on shaft 48. Surface 52 is slightly concave, so as to accommodate the pipe surface. A plurality of washers 54 holds the roller a predetermined distance from face plate 44, and a sleeve 56 and set screw 58 hold the roller in that position. As can be seen, the position of roller 50 can be changed by merely adding or taking away washers 54. Again, it is to be noted that this is only one of several designs of roller assembly that can be employed in the invention.

FIGURE 3 shows a partial side elevation of the lifting beam and an end view of same. As can be seen most clearly in the end view, the basic construction is simple: two channel members 60, 62 are welded along one side to a plate 64, to form a fabricated deep channel beam of substantial strength. It is preferred that these members be of a light, strong alloy inasmuch as the beam and the pipes must be supported by a crane located on one side of the trench. Cable rings 66 are located at each end of the beam and, if necessary, in the center. Support for an individual pipe is provided by two bolts 68, 70 attached to plate 64 by a fixed nut 72 and one or more tightenable nuts 74. The free end of each bolt 68, 70 has attached thereto a clevis 76, 78, which by means of a pin 80 supports a cord type belt pipe sling 82. Different sizes of pipe can be accommodated in the slings as shown, within certain limits, and larger variations can be taken care of by merely changing the spacing between bolts 68 and 70, a matter of drilling or burning an additional hole in plate 64. Similarly, the number of pipes merely determines the number of slings employed. Beams with as many as sixteen separate slings are practical.

In operation, the bull-noses 38 (FIGURE 1) are removed from the welded pipe and the slings are passed under each pipe. The crane then travels down to near the first roller and lifts the pipes. The roller is removed or disassembled, and the crane lowers the beam and the pipes into the trench bottom. It is to be noted that fine adjustments to insure alignment with previously laid sections can be made at this point. The pipes are now supported on the next roller, and, without disengagement, the crane moves the beam down near that roller and the operation is repeated. In this manner, the entire group of parallel welded pipes is lowered in a single operation.

Welds to previously laid sections are made with external line-up clamps in the trench. It is to be noted that the field welds are preferably made while the pipe is still supported on the rollers. Thus, after the pipe has been pulled as far as the winch and roller permit, the welding and preparation racks are removed and connecting sections are welded to the previously laid sections. After connection has been made, the beam lifts the pipes, the rollers are winched out of the trench and the pipes are lowered.

After completion of this phase, the crane, moves the entire assembly, preparation rack, welding rack, welding shed and winch unit, the proper distance up the trench, and after necessary reassembly, levelling and connection, the operation is repeated. In this manner a saving of about 50% in the man-hours per foot of pipe laid is effected.

In particular, it will be obvious that while the invention has been described with reference to laying pipes below grade, it is equally applicable to laying pipe at grade level or on sleepers.

Various changes in the details, materials, steps and arrangements of parts, which have herein been described and illustrated in order to explain the nature of the invention, have been made by those skilled in the art within the priiciples and scope of the invention as described in the appended claims.

What is claimed is:
1. A coordinated pipe laying assembly for laying a plurality of parallel pipes that comprises:
   first pipe support means for carrying a plurality of discrete pipe sections in parallel relation;
   second pipe support means adjacent said first support means and having means associated therewith for joining said discrete pipe sections to previously joined sections in said parallel relation;
   leveling means on each said first and second pipe support means for bringing successive pipe sections into alignment;
   winch means for pulling joined sections off said support means after joining a pipe section;
   a plurality of roller support means in spaced relation between said second support means and said winch means capable of support a plurality of parallel pipes as they are pulled from said second pipe support means by said winch means; and
   beam means capable of lifting a plurality of parallel pipes simultaneously from one of said roller support means and lowering the same.
2. The pipe laying assembly as claim in claim 1, wherein said first pipe support means comprises a generally rectangular frame having a plurality of rows of pipe-supporting rollers in spaced parallel relation on the upper side thereof.
3. The pipe laying assembly is claimed in claim 1, wherein said second pipe support means comprises sections at either end thereof having a plurality of rows of pipe supporting rollers in spaced parallel relation and a central, open section where pipes supported on said end sections are unsupported.
4. The pipe laying assembly as claimed in claim 3, and additionally comprising enclosure means including floor, wall and roof means, said enclosure means enclosing said open section and at least a portion of said end sections of said second pipe support means, said wall means including openings for pipes supported on said rollers.
5. The pipe laying assembly as claimed in claim 1, wherein said means for joining said pipe sections comprises welding means.
6. A coordinated pipe laying assembly for laying a plurality of parallel pipes in a trench below grade level that comprises:
   a pipe preparation rack within said trench and having a plurality of rows of pipe-supporting rollers in spaced, parallel relation, said rows being parallel with said trench, and said rack having adjustable legs;
   a welding rack adjacent said pipe preparation rack and having parallel rows of pipe-supporting rollers in line with the rows on said preparation rack, a central, transverse open section where pipe on said rollers is unsupported, said rack also having adjustable legs;
   a welding shed having a floor, walls and a roof enclosing said open section and at least a portion of said welding rack, said shed having openings in the walls thereof to accommodate said welding rack and pipe supported thereon;
   winch means in said trench on the side of said welding rack opposite said preparation rack, and capable of pulling pipe off of said welding rack;
   a plurality of pipe-supports in spaced relation between said welding rack and said winch means, each said support comprising a number of pipe-supporting rollers equal to the number of rows of rollers on said welding rack; and
   a lifting beam having a plurality of pipe slings along the length thereof and capable of lifting pipes from each roller of one of said pipe supports simultaneously and lower the same into said trench.

References Cited
UNITED STATES PATENTS

| | | | |
|---|---|---|---|
| 2,603,523 | 7/1952 | Cameron | 294—81 |
| 2,969,102 | 1/1961 | Cunningham | 294—81 |
| 3,252,729 | 5/1966 | Holmes | 294—81 |
| 2,371,090 | 3/1945 | Westin | 29—33.21 |
| 2,231,014 | 2/1941 | Lytle | 29—33.21 |

RICHARD H. EANS, Jr., *Primary Examiner.*